United States Patent Office 3,360,224
Patented Dec. 26, 1967

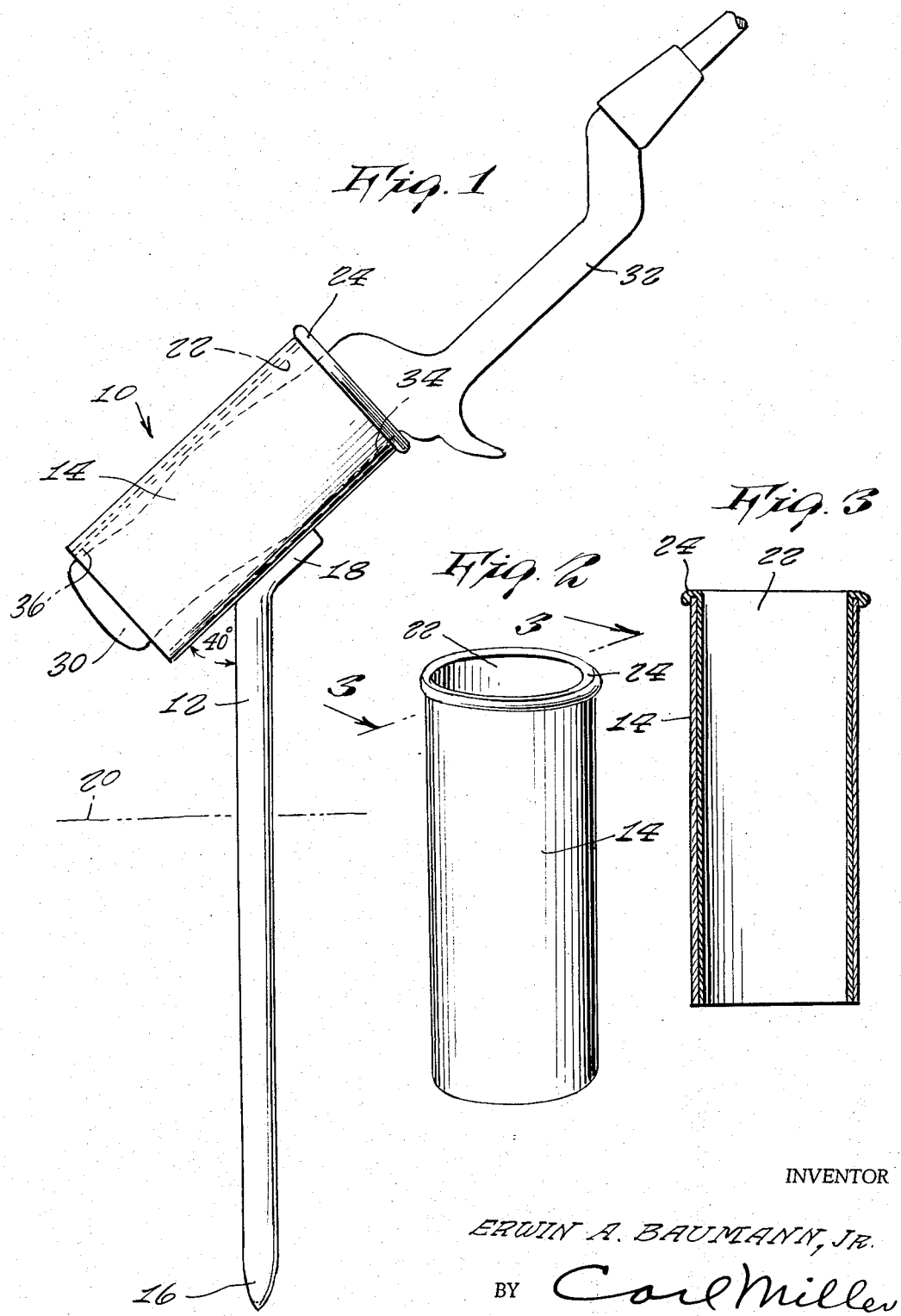

3,360,224
HOLDER FOR FISHING ROD HANDLE
Erwin A. Baumann, Jr., 9928 Slevin Lane,
Affton, Mo. 63123
Filed July 28, 1965, Ser. No. 475,420
1 Claim. (Cl. 248—44)

ABSTRACT OF THE DISCLOSURE

A fishing rod holder having a rubber lined open ended cylinder to receive therein the handle of a fishing rod and a supporting ground penetrating stake for the cylinder having its upper end bent and rigidly secured to a medial portion of the underside of the cylinder such as to support the cylinder in an inclined position and with the rubber liner providing a frictional gripping engagement with the handle of the fishing rod.

This invention relates to a holder or support for a fishing rod.

It is the primary object of this invention, to provide a holder or support adapted to be inserted into the ground or sand for holding the handle of a fishing rod, thus freeing the hands of a fisherman to permit him to perform other tasks or rest as the occasion demands.

Another object of this invention relates to forming the holder with a ground penetrating stake having secured at its upper end a tubular element adapted to receive and hold the handle of a fishing rod, the tubular element being inclined with relation to the stake so as to support the fishing rod at a proper angle with reference to the ground.

A further object of this invention relates to providing the interior of the tubular element with a rubber lining having a bead fitted over the upper edge of the tubular element, the rubber lining serving to provide a friction grip on the handle of the fishing rod when inserted therein, such as to prevent the handle from pulling out when a fish is caught.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described within the scope of the appended claim.

FIGURE 1 is a side elevational view of the fishing rod holder in operative use.

FIGURE 2 is a perspective view of the tubular support for the handle of the fishing rod.

FIGURE 3 is a vertical sectional view taken on line 3—3, FIGURE 2.

Referring more particularly to the drawings, it will be seen that the holder 10 making up my invention comprises a stake 12 carrying a tubular support 14. The stake 12 is made of metal of any desired cross-sectional configuration and of any suitable length. Found to be suitable for most purposes is a stake formed of ½ inch diameter rod and 12 inches long. The lower end of the stake 12 is pointed as at 16, and the upper end of the stake is bent to provide an attaching portion 18, that is ¾ inch in length and inclined at a 40° angle to the axis of the stake.

The tubular support 14 is formed of a length of metal conduit or pipe of an inside diameter of 1⅜ inches and is 3¾ inches long. The attaching portion 18 of the stake is permanently secured to the tubular support 14 intermediate its ends as by welding or otherwise to thereby place the axis of the attaching portion at a 40° angle to the axis of the stake as well as to the plane of the ground 20 when the stake 12 is inserted thereinto. The inside surface of the tubular support 14 is covered by a molded soft rubber liner 22 which is secured thereto by a suitable adhesive. A single circular bead 24 on the upper end of the liner 22 is formed with a circular groove into which extends the upper edge portion of the tubular support 14.

In its operative use, the holder 10 is fixed in the ground, sand, etc. by the insertion of the stake 12 thereinto. On placement of the handle 30 of a fishing rod 32 within the tubular support 14, it is seen that the weight of the fishing rod 32 will tilt the handle 30 therein, such that the forward portion of the handle 30 will engage the tubular support as at 34 while the rear end of the handle 30 will engage the tubular support as at 36, the points 34 and 36 being respectively at the lower end of the front edge and at the upper end of the rear edge of the tubular support. Thus, the handle 30 is inclined in the tubular support 14, and is securely held therein against outward movement, should a pull on the line occur, the rubber liner 22 gripping the handle. The fishing rod 32 is held at a proper angle, substantially 40°, by the tubular support 14, should a different angle be deemed desirable. This is obtained by inserting the stake 12 into the ground at an inclination such as to provide for such different angle.

While certain novel features of my invention have been shown and described and are pointed out in the annexed claim, it will be understood that various omissions, substitutions and changes in the forms and details of the device illustrated and in its operation can be made by those skilled in the art without departing from the spirit of the invention.

Having thus described my invention, I claim as new and desire to secure by Letters Patent:

A holder for a fishing rod having a handle, comprising:
(a) a cylindrical member for receiving said handle open at each end and of a length such as to substantially contain the entire handle,
(b) a molded soft rubber sleeve lining the inside surface of said cylindrical member,
(c) a single circular bead on one end of said sleeve having a groove receiving one terminal edge portion of said cylindrical member,
(d) a ground penetrating stake having a lower end portion tapering to a point,
(e) the upper end portion of said stake being bent to have an angular inclination of at least 40° relative to the axis of said stake,
(f) the length of said bent portion being less than the length of said cylindrical member and said bent portion being longitudinally rigidly secured to said cylindrical member intermediate its ends at substantially the medial portion thereof,
whereby in the vertical position of said stake when inserted into the ground said cylindrical member will be inclined at least 40° relative to the axis of the stake with the rubber beaded terminal end thereof uppermost and said rubber liner providing a frictional gripping engagement with the handle of the fishing rod.

References Cited

UNITED STATES PATENTS

| | | | |
|---|---|---|---|
| 142,126 | 8/1873 | Senieur | 248—38 |
| 1,952,789 | 3/1934 | Butts | 248—38 |
| 2,211,278 | 8/1940 | Le Febvre | 248—45 |
| 2,311,823 | 2/1943 | Gaskill | 248—42 XR |
| 2,694,538 | 11/1954 | Consolo et al. | 248—42 |
| 3,259,346 | 7/1966 | Rogers | 248—42 |

JOHN PETO, *Primary Examiner.*